United States Patent
Toffolo et al.

Patent Number: 5,867,133
Date of Patent: Feb. 2, 1999

[54] DUAL USE DISPLAY

[75] Inventors: Daniel Toffolo, Dearborn; Silviu Palalau, Birmingham, both of Mich.

[73] Assignee: UT Automotive Dearborn, Inc., Dearborn, Mich.

[21] Appl. No.: 764,183

[22] Filed: Dec. 13, 1996

[51] Int. Cl.⁶ .................................................. G09G 5/00
[52] U.S. Cl. .................................. 345/7; 345/8; 349/11; 353/13; 359/630; 359/632
[58] Field of Search .......................... 345/7, 8, 9; 349/11; 353/13, 14; 359/630, 631, 632

[56] References Cited

U.S. PATENT DOCUMENTS

| | | | |
|---|---|---|---|
| 4,886,328 | 12/1989 | Iino | 340/980 |
| 5,294,940 | 3/1994 | Wennagel et al. | 345/31 |
| 5,296,868 | 3/1994 | Itami et al. | 345/7 |
| 5,361,165 | 11/1994 | Stringfellow et al. | 345/9 |
| 5,386,216 | 1/1995 | Iino | 345/7 |
| 5,497,271 | 3/1996 | Mulvanney et al. | 359/631 |
| 5,646,639 | 7/1997 | Koie | 345/7 |
| 5,734,357 | 3/1998 | Matsumoto | 345/7 |
| 5,734,358 | 3/1998 | Sumiyoshi | 345/7 |

FOREIGN PATENT DOCUMENTS

| | | |
|---|---|---|
| 0643315A1 | 3/1995 | European Pat. Off. . |
| 0649263A2 | 4/1995 | European Pat. Off. . |
| 19525602A1 | 1/1996 | Germany . |

*Primary Examiner*—Jeffery A. Hofsass
*Assistant Examiner*—Davetta Woods
*Attorney, Agent, or Firm*—Howard & Howard

[57] ABSTRACT

A dual use heads-up display panel for a vehicle may be orientated in a first orientation wherein it displays information onto the window of a vehicle. The display panel may be selectively moved to a facing-forward position wherein it directs information towards the operator of the vehicle. The control for the display panel determines which of the two positions the display panel is in, and modifies the information displayed on the panel accordingly. The information should be reversed in a mirror image between the two orientations such that it is properly orientated when read off of the windshield, and is also properly orientated when read from the facing-forward position. In a further feature, a convergent optical system, which may be a lens, is placed in the path of the light from the display panel when in the heads-up position. The lens causes the size of the information displayed on the windshield to be reduced such that its intensity is increased.

15 Claims, 3 Drawing Sheets

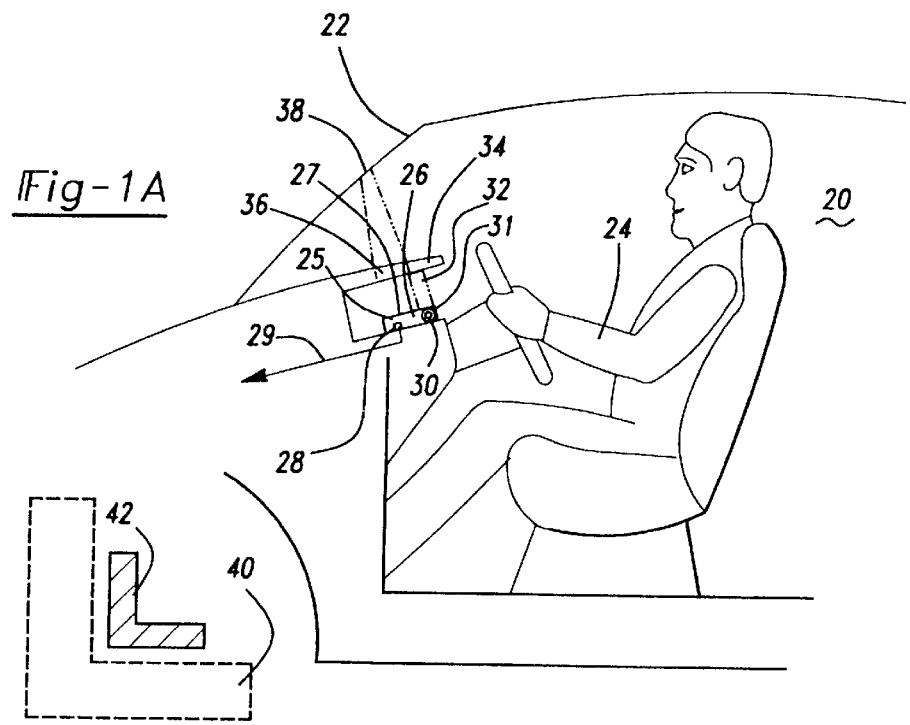
Fig-1A
Fig-1B
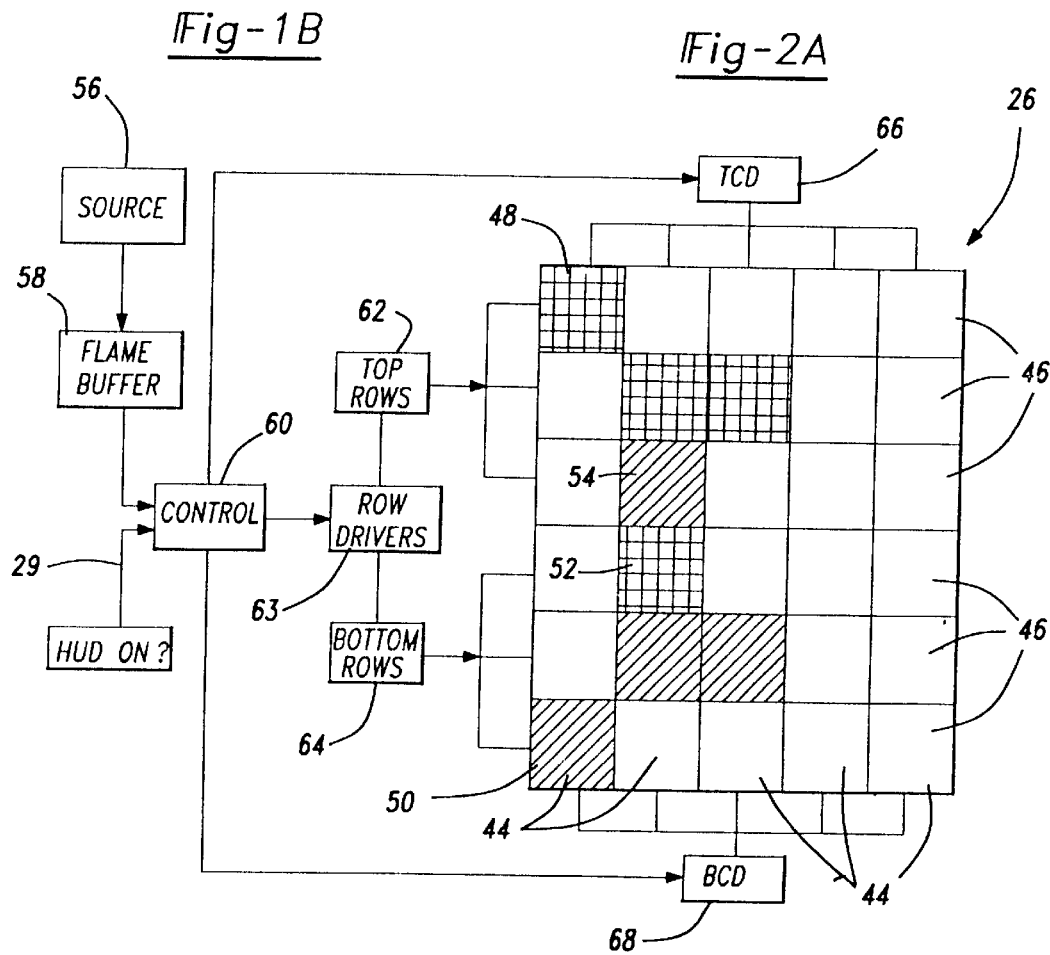
Fig-2A

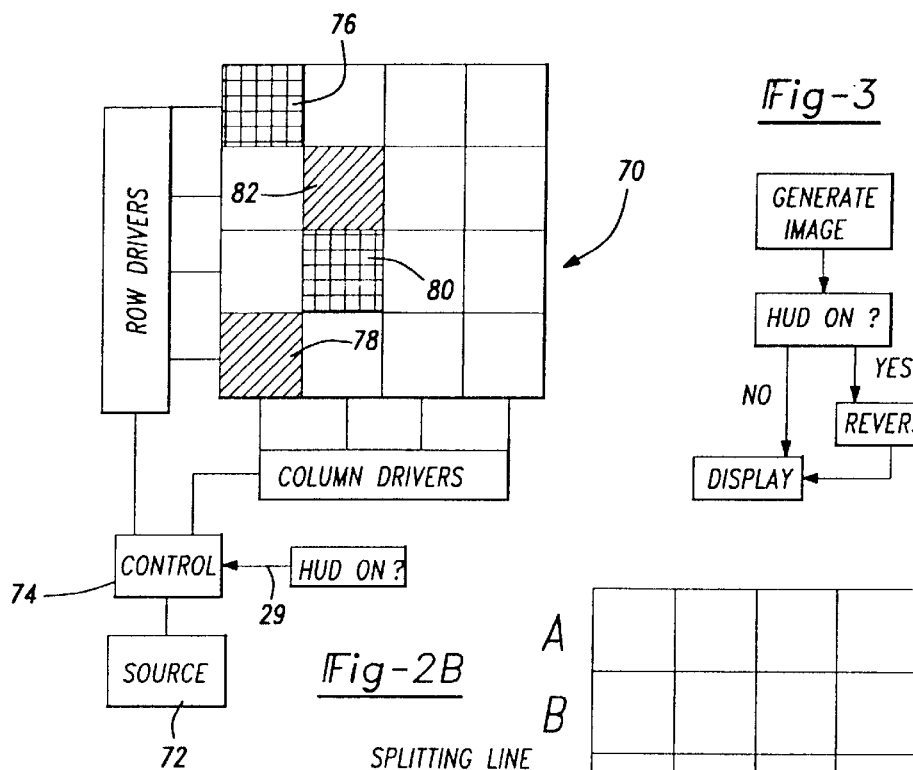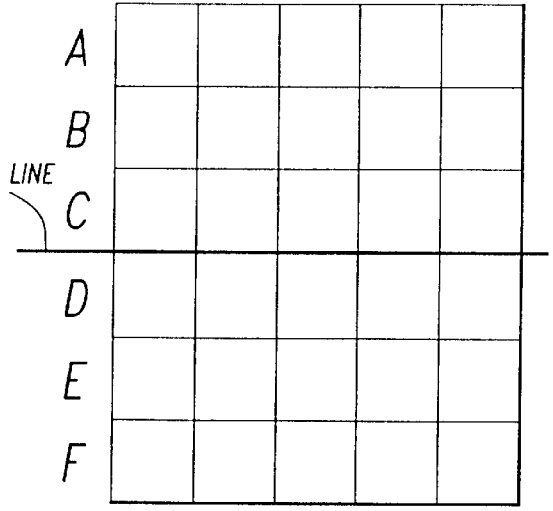

BUFFER

HUD ON - OPTION #1-SPLIT

| DATA | TOP | FED |
| SEQUENCE | BOTTOM | CBA |
| ROW | TOP | ABC |
| SEQUENCE | BOTTOM | DEF |

HUD ON - OPTION #1-NOT SPLIT

F E D C B A

A B C D E F

HUD OFF - OPTION #1-SPLIT

| DATA | TOP | ABC |
| SEQUENCE | BOTTOM | DEF |
| ROW | TOP | ABC |
| SEQUENCE | BOTTOM | DEF |

HUD OFF - OPTION #1-NOT SPLIT

A B C D E F

A B C D E F

HUD ON - OPTION #2-SPLIT

| DATA | TOP | DEF |
| SEQUENCE | BOTTOM | ABC |
| ROW | TOP | CBA |
| SEQUENCE | BOTTOM | FED |

HUD ON - OPTION #2-NOT SPLIT

A B C D E F

F E D C B A

HUD OFF - OPTION #2-SPLIT

| DATA | TOP | CBA |
| SEQUENCE | BOTTOM | FED |
| ROW | TOP | CBA |
| SEQUENCE | BOTTOM | FED |

HUD OFF - OPTION #2-NOT SPLIT

DUAL USE DISPLAY

BACKGROUND OF THE INVENTION

This invention relates to a heads-up display which can alternatively be moved to a facing-forward position.

Heads-up displays have been utilized recently to convey information onto the windshield of a motor vehicle. Heads-up displays are utilized to convey information about road characteristics or vehicle conditions onto the windshield where they will be plainly visible to the driver. Typically, only more important information is conveyed to the driver in this way.

The known heads-up displays have allowed little choice to the operator of the vehicle in selecting whether the heads-up display should be utilized. In some applications, the operator may wish to have a forward-facing display rather than a heads-up display.

In one proposed prior system, a heads-up display is placed rearwardly of a mirror. The mirror may be removed, or rendered transparent, such that the information is visible through the mirror. If the mirror is left in its mirror configuration, the heads-up information is displayed on the windshield. The operator can thus choose between heads-up or forward-facing display. The proposed device would be unduly complex, and difficult to utilize.

Other deficiencies with known heads-up displays relate to the intensity of the displayed information. In known heads-up displays, the information to be displayed on the windshield passes through a lens which spreads the information or makes it larger. Thus, the size of the information from the original display panel is smaller than the actual information displayed on the windshield. This reduces the intensity of the information displayed on the windshield. In certain light situations, this may be undesirable.

SUMMARY OF THE INVENTION

A proposed dual use display may be positioned in either a heads-up or a facing-forward location. A control for the display receives a signal indicating whether the display is in the heads-up or forward-facing position. If in the heads up position, then the control modifies the information such that it is distinct from the information as displayed in the forward-facing orientation. In the heads-up orientation, the information is typically a mirror image of that which is displayed in a forward-facing situation.

The control in this invention determines whether the display is in heads-up or forward-facing mode, and then ensures the information is displayed in the proper orientation. In one embodiment, the display is provided with a snap which snaps to the vehicle frame when in the heads-up display. An electrical connection is complete when the heads-up is snapped onto the frame. This provides an indication to the control of whether the device is in a heads-up orientation. A spring is provided on a hinge mount for the display. If the snap is released, then the display is biased to the forward-facing position. Other mechanical arrangements for moving the display between its heads-up and forward-facing orientations may be utilized. In addition, other switching devices may be utilized to provide a signal of whether the display is in heads-up or forward-facing orientation.

In a simple display, the image must only have its rows reversed to switch between heads-up and forward-facing orientation. In a more complex display, there are at least one set of row drivers and at least two sets of column drivers. The control must determine the break point between the two, and properly reverse the image as necessary for the row drivers.

In a further feature of this invention, a convergent optical system, which may simply be a lens, is placed between the display and the windshield. The convergent optical system reduces the size of the image which is displayed on the windshield. In this way, the light intensity of the image is increased.

These and other features of the present invention can be best understood from the following specification and drawings, of which the following is a brief description.

BRIEF DESCRIPTION OF THE DRAWINGS

FIG. 1A is a schematic view of a display in a vehicle interior.

FIG. 1B shows one feature of this invention.

FIG. 2A shows a first display system.

FIG. 2B shows a simplified display system.

FIG. 3 is a simplified flow chart of the present invention.

FIG. 4A is a schematic view of a display panel.

FIG. 4B shows possible scanning direction options for a "no buffer" display.

FIG. 4C shows scanning direction options for a "buffer" display.

DETAILED DESCRIPTION OF A PREFERRED EMBODIMENT

FIG. 1A shows a vehicle interior 20. A windshield 22 is positioned forwardly of an operator 24. A display panel 26 is shown in a position such that a top display surface 27 is orientated to face the windshield 22. This is a "heads-up" position. Information from the display face 27 will be displayed on the windshield 22. A snap 28 is shown received within an opening 25 in the panel 26. When opening 25 is snapped onto snap 28, the panel 26 is secured in this heads-up position. As shown, a signal line 29 may also send a signal to a control when the panel 26 is in this position. In this embodiment, a switch to provide the signal could be simply incorporated into the snap 28. Other type switches such as mercury level switches, etc., can also be utilized to determine the orientation of the display panel 26.

As shown at 30, the panel 26 is hingedly mounted to the frame. A spring 31 is shown schematically, and normally biases the panel 26 about the hinge axis to a facing-forward position 32. Thus, should the panel 26 be removed from the snap 28, the panel is then biased by spring 31 to the position 32. It should be understood that other orientations and other mechanical arrangements may be utilized for supporting and moving the panel 26 between the heads-up position and the facing-forward position.

As shown, a portion 34 of the vehicle dashboard receives an optical system, which may simply be a lens 36. The lens 36 serves to concentrate or converge the image from the panel face 27 to an area 38 on the windshield 22. Now, since lens 36 causes the image to be reduced, the intensity of the displayed image is increased.

FIG. 1B illustrates this concept. FIG. 1B shows the original image 40 as may have been found on the display panel face 27. The lens 36 has now reduced the size of that image to the size 42. The image then has greatly increased intensity. The relative sizes of the images 40 and 42 may be exaggerated to show the concept. In fact, it may not be necessary to reduce an image to this extent.

FIG. 2A shows a first system for achieving either heads-up or facing-forward use. As shown, the panel 26 is comprised of a plurality of pixels defined by a series of columns 44 and a series of rows 46. The intersection of each row in each column defines a pixel. The pixel 48 in the first column and first row is shown dark, and represents a pixel which is "on". Three other pixels are shown in the same on orientation. The four "on" pixels shown in FIG. 2A are illustrated to describe an image. Of course, real life images typically convey information to the operator in some fashion. However, for simplicity's sake, this simplified block image will be utilized for the explanation of the invention.

If the pixel 48 is a portion of the image for the facing-forward display, then the image must be reversed into a "mirror" fashion for application as a heads-up display. Thus, in a heads-up display, rather than the block 48 being "on" pixel 50 should be "on". The image on the windshield would be the same from pixel 50 in the heads-up mode, as from pixel 48 in the facing-forward mode.

A lower portion of the display is shown at pixel 52 for the facing-forward orientation. That pixel would correspond to pixel 54 in the heads-up orientation. The use of the control for achieving either heads-up or facing-forward orientation will be explained with particular reference to pixels 48 and 50 and 52 and 54.

An image is conveyed from an image source 56. The image could be information of any sort which is to be conveyed to an operator of the vehicle. The image may pass into a frame buffer 58, where it may be stored for use on the panel 26. These aspects are as known in the art.

A control 60 for the display then receives the information from the frame buffer, and must determine from signal 29 whether the information needs to be rearranged for heads-up display. The signal 29 from the switch at 28 is conveyed to control 60. As shown, the display 26 has at least one set of row drivers 63 which drive top rows 62 and bottom rows 64. The row drivers convey a voltage to each row to result in certain of the pixels possibly being "on". Similarly, the system includes a top set column drivers 66 and a bottom set of column drivers 68. The column drivers convey a voltage onto selected ones of the columns to achieve pixels being "on".

If control 60 determines that the heads-up display is off, then it may simply pass the information from image source 56 through the frame buffer 58, and to the column drivers. The fully-darkened block such as blocks 48 and 52 are then "on" or lit. The operator will be able to see this information from the display in the facing-forward orientation 32.

However, should control 60 determine that the display is in the heads-up orientation, then the displayed information must be reversed. The control 60 must first determine what information would normally be displayed on each of the top and bottom rows. In the illustrated embodiment, the information here from the top three rows must be reversed and sent to the bottom rows. At the same time, the information from the bottom three rows must also be reversed and then sent to the top rows. Simply, the bottom row driver 64 must be told to light its first row such that the pixel 50 is lit in place of the pixel 48. Similarly, top row driver 62 must be instructed to light its bottommost row such that pixel 54 is also lit to correspond to pixel 52. The controls necessary to achieve this rapid reversal are within the skill of a worker in this art.

FIG. 2B shows a simplified application wherein there are not top and bottom row drivers, nor a frame buffer. Instead, in system 70, image source 72 sends the information directly to the control 74. The control determines whether signal 29 indicates the display is in a heads-up position. If so, then the row driver scanning direction is reversed. Here, the forward facing mode pixel 76 would be reversed to the lowermost row and displayed as pixel 78 for heads-up mode. Similarly, pixel 80 would be reversed from the third row to the second row and displayed as pixel 82.

It should be understood that this illustration is greatly simplified. The displays which will typically be utilized in vehicle applications may contain hundreds of rows and columns. However, for purposes of understanding this invention, the simplified illustrations have been utilized.

FIG. 3 is a brief flow chart of the inventive method. An image is first generated. This operation proceeds no differently than in the prior art. A control then determines whether the heads-up display orientation is being utilized. If the answer is no, then the control proceeds to display the image. If the answer is yes, then the control must first reverse the image and then display the image. If there is a memory buffer, the system has the option of reading the memory in reverse fashion and energizing the rows in a normal mode, or reading the memory in a normal mode and energizing the rows in a reverse fashion. Of course, it should be understood that the control could operate in a reverse fashion. That is, the control could receive information already in reverse format for use as a heads-up display, and only reverse that information if it determines that heads-up display is not being utilized. Either method would come within the scope of this invention.

FIG. 4A shows a display panel having six rows A–F. A split line is shown in the center. In a split display, the columns do not extend from top to bottom of the entire display. Instead, there are two separate column portions. This allows one to energize a row associated with both the top and bottom column portions simultaneously. The options available in scanning direction will now be explained by the charts of FIGS. 4B and 4C.

FIG. 4B shows the options when there is no buffer. If the display is split, the data sequence will be split such as shown in FIG. 4B. If there is a split display and heads up display is on, then the data sequence is multiplexed between top and bottom, and row energization is reversed to achieve the heads up display. If the heads up display is off, then the data sequence would typically come in the same order as the forward image display sequence. As explained in other portions of this application, it would also be possible to receive the data properly orientated for the heads up display, and then to reverse for the situation where the heads up display is off and forward image display is being operated.

FIG. 4C shows other options available when there is a buffer. When there is a buffer, then the data may be accessed in one of two options. In a first option, the data is accessed in a bottom to top order. The row sequence is reversed for display when the heads up display is on. If using this option, and the heads up display is off, then the data may be accessed in the same order that the rows are energized.

In a second option, the data is accessed in a top to bottom order. It is reversed for heads up display. Again, if the heads up display option is off, then the data may be accessed in the same order in which it is to be displayed.

These options shown in FIGS. 4B and C are exemplary of the options available to a designer. It may be possible to identify other possible options within the scope of this invention. Again, the main thrust of this invention is to achieve "mirror image" between heads up display and non-heads up display options.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A display system comprising:
   a panel mounted within a vehicle such that a display face of said panel may be mounted in a first orientation to display information on a vehicle windshield, and is movable to a second orientation where it faces an operator; and
   a control for said panel, said control being operable to determine if said panel is in said first or said second orientation, and reverse the information displayed on said panel between said two orientations.

2. A display as recited in claim 1, wherein said information is directed to said control in an orientation to be displayed in said second orientation and is only reversed if said control determines said panel is in said first orientation.

3. A display as recited in claim 1, wherein said control receives information on whether said panel is in said first orientation.

4. A display as recited in claim 1, wherein said display panel includes row drivers for driving rows on said display face, and the energization order of the rows being reversed as required between each of said row drivers.

5. A display as recited in claim 4, wherein said display panel also includes at least two sets of column drivers, and said information being reversed as necessary between said column drivers.

6. A display as recited in claim 1, wherein a spring biases said panel to said second orientation from said first orientation.

7. A display as recited in claim 6, wherein structure secures said panel in said first position.

8. A display as recited in claim 1, wherein a convergent optical system is placed in the path of light passing from said display panel toward the windshield, such that the image displayed on the windshield is smaller than the size of said image displayed on said display panel.

9. A method of displaying information in a vehicle comprising the steps of:
   (1) providing a display panel operable to display an image, said panel being movable between a first orientation where it displays information on the windshield of the vehicle and to a second orientation where it displays information forwardly towards an operator of the vehicle;
   (2) moving said panel to one of said first and second orientations;
   (3) determining whether said panel is in said first or said second orientation; and
   (4) modifying information as necessary based upon said determination of step (3), such that the information displayed in said first orientation is a mirror image of the information provided in said second orientation.

10. A method as recited in claim 9, wherein said information is received by said control, and simply displayed if said panel is in said second orientation, said information being reversed if said display panel is in said first orientation.

11. A method as recited in claim 9, wherein said panel actuates a switch when in said first orientation, said switch providing said control with the information of step 3.

12. A method of displaying information as set forth in claim 9, wherein said panel is secured at said first orientation.

13. A method as recited in claim 12, wherein said panel is biased to said second orientation.

14. A display for a vehicle comprising:
   a display panel orientated such that information generated on said display panel is directed onto a windshield of a vehicle, there being a light path from said display panel to the windshield; and
   a convergent optical system placed in said light path and between said display panel and said windshield, said convergent optical system causing the dimension of an image generated by said display panel to be reduced before being displayed on said windshield, such that an identical image will be displayed on said display panel and on said windshield, but being of a smaller dimension on said windshield.

15. A display panel as recited in claim 14, wherein said display panel is selectively movable from said first orientation to a second orientation where it no longer directs information onto said windshield.

* * * * *